June 8, 1948.                C. W. MADSEN                2,443,143
                            METHOD OF OILING
                       Original Filed Jan. 21, 1942
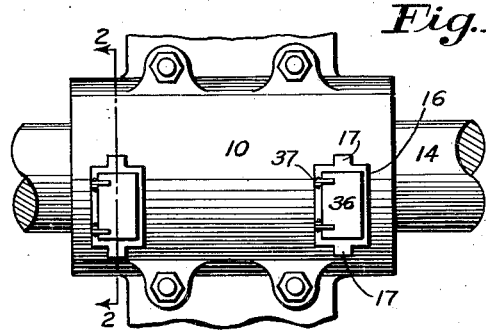
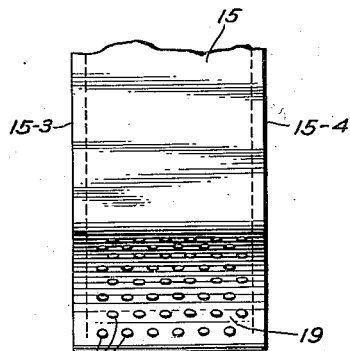
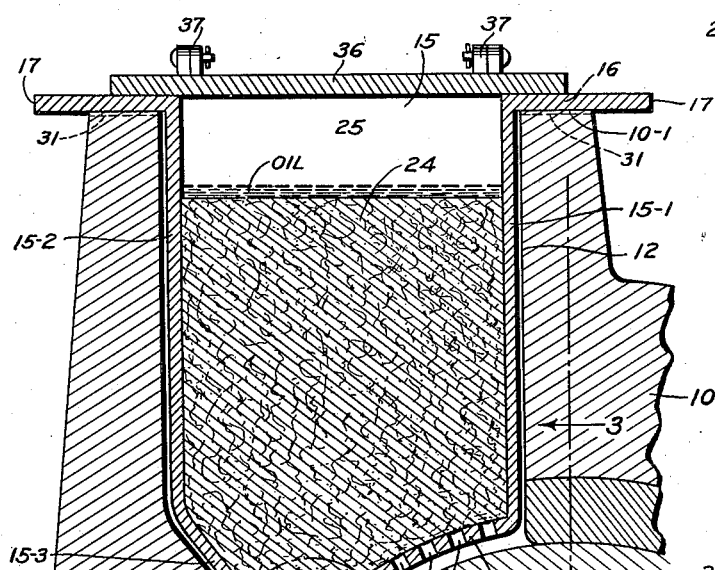
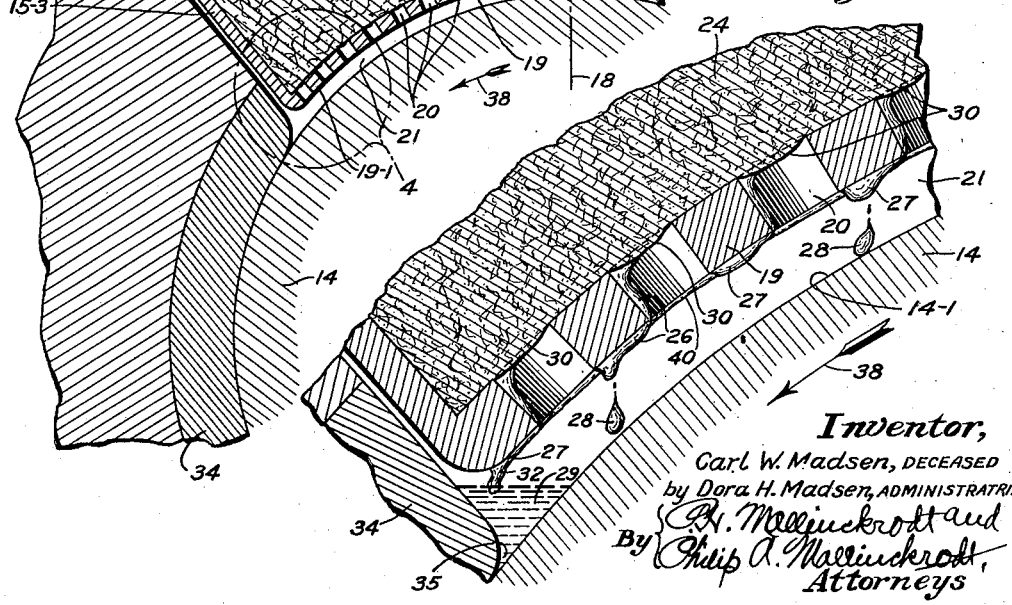
*Inventor,*
Carl W. Madsen, DECEASED
by Dora H. Madsen, ADMINISTRATRIX
By C. H. Mallinckrodt and
Philip A. Mallinckrodt,
*Attorneys*

Patented June 8, 1948

2,443,143

UNITED STATES PATENT OFFICE 2,443,143

METHOD OF OILING

Carl W. Madsen, deceased, late of Magna, Utah, by Dora H. Madsen, administratrix, West Jordan, Utah, assignor, by decree of distribution, to Dora H. Madsen Original application January 21, 1942, Serial No. 427,579. Divided and this application December 3, 1945, Serial No. 632,409

5 Claims. (Cl. 184—1)

This invention relates to a method of oiling journal bearings and more particularly bearings of the so-called waste-packed type that are extensively used with shafts of heavy machinery, such as modern rock or ore crushing rolls. However, the use of the invention is not necessarily restricted to bearings of large sizes.

Among the principal objects of the invention are the following:

*First.*—To provide an overhead feed of oil rather than one which draws oil from underneath a shaft.

*Second.*—To provide a practical and efficient means of supplying oil or other lubricant to a rotating shaft so that the amount of oil or lubricant is always ample but not wasteful.

*Third.*—To eliminate troubles that are prevalent in substantially all bearings of the waste-packed or wick-packed types as heretofore constructed.

*Fourth.*—To eliminate the possibility of damage to the packing material caused by hardening or burning in consequence of running contact with a shaft; thus the packing material is rendered fit for continuous use or for re-use.

*Fifth.*—To economize oil, because the oil is not rapidly siphoned off.

*Sixth.*—To prevent the cutting or scoring of a shaft, because all dust and dirt that is caught by the packing material is always out of direct contact with the shaft surface.

Other objects will become apparent as the description progresses.

In bearings of the type to which the invention relates, a relatively large mass of waste, preferably wool waste, is tightly packed in a confined cavity or chamber and serves as an absorbent reservoir from which oil feeds into the bearing.

It is well known to users of heavy machinery in which waste-packed bearings are used, that when the packing is in running contact with the shaft, the shaft gradually wears down and becomes smaller in diameter at the area of contact because of the constant friction between the packing and the metal of the shaft. The rapidity of wear naturally depends upon the location in which the shaft is operating, that is to say, when machines are operated in very dusty places, gritty particles are picked up by the packing and are worked down into the bearing, thus producing an abrasive wear upon the shaft. When a new bearing is applied to a worn shaft, the bearing does not make full contact with the shaft, whereupon the bearing wears more or less to the shape of the worn shaft. Then, if such a worn bearing is applied to the shaft, the bearing frequently fails from overheating, and the material of the bearing, such as Babbitt metal, freezes to the worn surface of the shaft, thus preventing removal of the bearing without considerable trouble. In cases of that kind it is frequently necessary to heat the bearing sufficiently to soften the Babbitt metal so that it can be forced over and off the worn part of the shaft, thereby destroying its further usefulness.

Waste-packed bearings as ordinarily constructed, have the compacted waste always resting heavily upon a considerable portion of the journal area of the shaft. At the same time, the compacted packing closely contacts the walls of the reservoir cavity so that when a shaft is running it has the tendency to create a siphoning or pumping action through the packing, thereby drawing or sucking an excessive amount of oil into the bearing, which results in a corresponding wastefulness in the consumption of oil. Notwithstanding the excessive amount of oil used in waste-packed bearings as heretofore constructed, a shaft nevertheless is cut or scored because of its close contact with the packing.

By means of the novel method of applying oil according to the invention, the wear is enormously reduced, so that the life of the shaft and the life of the bearing are both correspondingly lengthened, while at the same time large quantities of oil are saved.

Briefly, the apparatus of the invention may include a waste-packed reservoir, the lower part of which is provided with a bottom whose under surface is spaced apart from the journal surface of the shaft so as to form a ceiling over a recess or cellar which is defined between the bottom and a certain corresponding journal area of the shaft. Communication between the absorbent waste content of the reservoir and the cellar may be established, for example, by means of numerous perforations extending through the bottom, such perforations being relatively small in size in order to prevent fibers of the waste from working through the perforations and coming in contact with the shaft.

An advantageous arrangement of the invention comprises an easily separable cup or container that is removably inserted in a receiving cavity of the bearing structure. The aforementioned bottom may be integral with the wall structure of the cup. In this arrangement, the required waste or wick packing is tightly compressed within the cup, but as the cup fits loosely in the reservoir cavity, the packed cup can be easily lifted out for any purpose desired, such as cleaning or inspection of the bearing.

In using the novel bearing, the lubricant, which may be an oil of the proper viscosity, is poured onto the compacted waste in quantity somewhat greater than that required to saturate the waste. As the shaft runs, oil is gradually released from the waste in a restricted flow which finds its way through the perforations and spreads over the ceiling area, where the oil is slowly collected in numerous depending, semi-globular masses. As the oil accumulates in the semi-globular masses, it finally becomes detached from the ceiling to form droplets which are drawn by the rotating shaft onto the bearing surface proper, thus bathing this surface continually in a film of clean lubricant.

The present invention is concerned with the method of oiling involved in using the apparatus forming the subject of the application for United States patent filed by Carl W. Madsen, deceased, January 21, 1942, Serial No. 427,579, entitled "Shaft Oiler," now matured into Patent No. 2,402,565 issued June 25, 1946, and constitutes a division of the subject matter of that application.

In the accompanying drawing which illustrates one embodiment of apparatus suitable for carrying the method of the invention into practice, Fig. 1 represents a plan, showing a roll bearing equipped with the invention;

Fig. 2, a vertical section taken on the line 2—2 in Fig. 1, and drawn to a scale considerably enlarged;

Fig. 3, a fragmentary elevation of the reservoir container or cup removed from the bearing and viewed in the direction of the arrow 3 in Fig. 2; and, Fig. 4, a further enlargement of a portion of Fig. 2, the location of this portion being indicated approximately by the broken line 4 in Fig. 2.

Referring to the drawing, the numeral 10 indicates a journal bearing rotatably supporting a shaft 14. In the upper part of the bearing 10 is a cavity or chamber 12 which may or may not be the same as provided in some of the waste-packed bearings as heretofore constructed. The lower part of the cavity or chamber merges into an aperture leading directly onto the portion of the shaft surface where the oil is to be applied.

In the preferred form of the apparatus of the invention a separable cup or container 15, advantageously made of metal, is loosely disposed in the chamber 12. In this instance the container is supported by means of a top flange 16 for convenience in handling the container.

In the present illustration one container wall 15—1 is located somewhat to the left of the vertical center line 18 passing through the shaft 14, while the opposite container wall 15—2 has its lower portion 15—3 sloping inwardly in order that the bottom of the chamber shall lie within the limits of the upper circumferential area of the shaft. The space between the wall portions of the container is bridged by the bottom 19, the latter being provided with numerous perforations such as those at 20. The underneath surface 19—1 of the bottom forms a ceiling that is spaced radially a limited distance from the circumferential surface of the shaft 14. This provision at least partially defines the oil-distributing space or cellar 21 above which the surface 19—1 functions as a drip ceiling. In other words, the oil that oozes from the waste-wool packing indicated at 24 finds its way largely by gravity through the perforations 20 and then forms a film along the ceiling, the oil being caused to drip from the ceiling onto the shaft surface 14—1. The spacing of the drip ceiling above the circumferential surface of the shaft is at least sufficient to allow the suspension of oil droplets from the ceiling. The arrangement of the perforations 20, for illustration by staggering their locations, is advantageously such as to break the continuity of flow of oil along the ceiling, thereby facilitating the formation of numerous oil droplets during the operation of the apparatus.

In using this oiling device a container 15 is preferably filled somewhat over one-half full of oil and cotton waste, or other suitable absorbent material, as indicated at 24, this material being compacted to a suitable density. The filtration or seepage of oil through the compacted material onto the bottom 19 takes place at approximately a desired predetermined rate for the purpose of regulating the amount of oil that finally reaches the bearing surface in a given unit of time. In predetermining the said desired rate of oil percolation through the reservoirs, the nature of the packing, the viscosity of the oil, together with the frictional heating properties of the shaft and its bearings must be taken into consideration.

Supposing that oil is poured into the space 25 and onto the surface of the absorbent packing 24, the latter immediately begins absorbing the oil preferably to the degree where it is fully saturated. After a while, if the conditions of temperature, viscosity of the oil, and so on, are favorable, oil will commence draining or oozing from the saturated waste onto the upper surface of the bottom 19 in a restricted or sluggish flow that gradually creeps through the perforations 20 and along the ceiling surface 19—1 approximately as indicated at 26 in Fig. 4. As the restricted flow of oil continues, it tends to form a film that overspreads the ceiling surface and finally becomes segregated in numerous semi-globular masses that depend from the ceiling 19—1, somewhat after the manner indicated at 27. The further enlargement of these semi-globular masses results in the detachment of droplets, such as those indicated for example, at 28. The droplets fall on the circumferential surface 14—1 of the shaft and coat the same with oil, any excess thereof collecting in a pool 29 that may tend to form in the lower part of space 21.

The tendency of the packing as illustrated at 30 Fig. 4 is to bridge the perforations 20 thereby preventing fibres from the reservoir packing from coming into frictional contact with the shaft.

A cover hinged at 37 in accordance with usual construction, may be desirable to keep dust and dirt away from the packing.

Any small quantity of oil that tends to be discharged directly into the pool 29 as indicated approximately at 32, funnels in between the bearing surfaces of the Babbitt lining 34 and the shaft surface 14—1, approximately as indicated at 35, thereby insuring complete coating of the journal.

Inasmuch as the container 15 fits loosely in the chamber 12 any tendency on the part of the rotating shaft to create a pumping or syphoning action through the reservoir packing is counteracted by the admission of atmospheric air passing down into the cellar between the chamber walls and the outside of the container, the spaces 31 being the channels through which the atmospheric air is admitted.

The invention functions to control the amount of oil that is supplied to a bearing by predetermining the amount of oil that percolates through the packing, largely under the influence of gravity. The cellar or oil-distributing space 21 is intended to function as a means to facilitate the free and efficient application of oil to the bearing surface, rather than itself serving as a storage space for the oil. To this end it is desirable that there be no intervening structure between the drip ceiling and the circumferential surface of the shaft below.

In order to obtain the best operating conditions in the use of the invention, it is recommended that lubricating oil be provided which has a viscosity such as to permit little or no drainage of oil from the container at normal temperatures, that is to say, when the shaft is not rotating. The viscosity, however, should be such that soon after the shaft begins to rotate, the slight heat generated by such rotation is radiated to the ceiling 19—1, thereby promptly starting the flow of lubricant from the more or less congealed film adhering thereto. As rotation of the shaft continues the bearing becomes warmer and warmer, thereby releasing a greater and greater flow of the oil held in the reservoir packing, and resulting in a tendency to keep the bearing cooled to a normal average operating temperature of a degree such that the flow of lubricant becomes substantially constant.

As an example of an oiler of the invention in satisfactory actual service with a bearing and shaft 10 inches in diameter, it may be stated that the bottom consists of a perforated brass plate about one-quarter inch thick assembled with steel plates, such as 15—1 to 15—4, all welded together into a unitary, integral structure. In this instance, the distance between the shaft and the ceiling, forming the cellar recess, is approximately one-quarter inch. The dimensions just given are merely suggestive.

In conjunction with the foregoing description of the novel apparatus, the novel method of oiling which forms the subject of the present invention, comprises the step which consists in forming an overhanging or suspended transitory film 40 of considerable area which in this instance is suspended by transitory adherence to the ceiling surface 19—1 in spaced relation to a corresponding and substantially coextensive circumferential shaft area. This suspended or overhanging oil film is spread over the ceiling surface and is fed by the oil that oozes from the absorbent reservoir 24. The oil film 40 in turn feeds the semi-globular oil masses 27 which then drip from the film 40. As hereinbefore stated, the warmth resulting from the friction of the rotating shaft in its bearing releases the oil normally congealed in the film and keeps up the flow and distribution of the oil over substantially the entire ceiling surface under ordinary running conditions. The method involves the consideration that the lubricating oil used with the apparatus is advantageously selected with respect to its viscosity. This viscosity should be such that when the shaft is at rest the oil is more or less congealed so as to be substantially retained in the film, but as soon as the shaft is put into motion, the moderate heat thereby generated becomes effective to reduce the viscosity of the oil to a point where droplets begin to form and to be gradually completed so that the weight thereof causes them to be detached from the film and drop onto the shaft surface. As the frictional heat rises and the need for more oil increases accordingly, the oil becomes still more fluid and thus supplies the greater requirement for lubrication.

In accordance with the novel provision of the invention a shaft bearing is adequately oiled while running, without wasting the oil because of flooding. Flooding not only wastes oil but results in excessive wear of the shaft and the bearing, owing to friction among the oil molecules themselves. The fact that a high degree of molecular friction is developed when excessive quantities of oil are used is well known to lubricating engineers.

A tabulation of results achieved in actual practice by means of the invention is disclosed in an inter-office communication of a large ore milling plant and is quoted herebelow:

Following is a comparative report showing the savings on oil and wool waste, effected by the use of the new oil feed boxes on the rolls in the Fine Crushing department, over a period of one year, from March 1941 to February 1942, as compared with the same period of time from March 1940 to February 1941, when the old system of packing the bearings with wool waste was in operation:

| Month and Year | Tons Ore Milled | Gallons Oil Used | Wool Waste Used | Cost of Oil at $.19 | Cost of Wool Waste at $12.62 | Total Cost | Amount Saved |
|---|---|---|---|---|---|---|---|
| | | | Pounds | | | | |
| Mar. 1940 | 1,134,200 | 737 | 700 | 140.03 | $88.34 | $228.37 | |
| Mar. 1941 | 1,228,400 | 822 | 150 | 156.18 | 18.93 | 175.11 | $53.26 |
| Apr. 1940 | 1,057,000 | 1,035 | 700 | 196.65 | 88.34 | 284.99 | |
| Apr. 1941 | 1,228,600 | 680 | 0 | 129.20 | | 129.20 | 155.79 |
| May 1940 | 1,063,300 | 952 | 700 | 180.88 | 88.34 | 269.22 | |
| May 1941 | 1,308,500 | 593 | 0 | 112.67 | | 112.67 | 156.55 |
| June 1940 | 1,072,100 | 1,049 | 700 | 199.31 | 88.34 | 287.65 | |
| June 1941 | 1,250,600 | 600 | 0 | 114.00 | | 114.00 | 173.65 |
| July 1940 | 1,076,300 | 1,035 | 700 | 196.65 | 88.34 | 284.99 | |
| July 1941 | 1,243,000 | 650 | 0 | 123.50 | | 123.50 | 161.49 |
| Aug. 1940 | 1,071,900 | 1,337 | 700 | 254.03 | 88.34 | 342.37 | |
| Aug. 1941 | 1,331,300 | 600 | 0 | 114.00 | | 114.00 | 228.37 |
| Sept. 1940 | 1,102,200 | 1,432 | 700 | 272.08 | 88.34 | 360.42 | |
| Sept. 1941 | 1,323,600 | 525 | 0 | 99.75 | | 99.75 | 260.67 |
| Oct. 1940 | 1,170,800 | 1,104 | 700 | 209.76 | 88.34 | 298.10 | |
| Oct. 1941 | 1,293,400 | 500 | 0 | 95.00 | | 95.00 | 203.10 |
| Nov. 1940 | 1,182,600 | 1,300 | 700 | 247.00 | 88.34 | 335.34 | |
| Nov. 1941 | 1,304,800 | 450 | 0 | 85.50 | | 85.50 | 249.84 |
| Dec. 1940 | 1,216,600 | 1,460 | 700 | 277.40 | 88.34 | 365.74 | |
| Dec. 1941 | 1,364,300 | 375 | 0 | 71.25 | | 71.25 | 294.49 |
| Jan. 1941 | 1,035,000 | 1,508 | 700 | 286.52 | 88.34 | 374.86 | |
| Jan. 1942 | 1,291,900 | 394 | 0 | 74.86 | | 74.86 | 300.00 |
| Feb. 1941 | 1,004,400 | 1,325 | 700 | 251.75 | 88.34 | 340.09 | |
| Feb. 1942 | 1,160,000 | 390 | 0 | 74.10 | | 74.10 | 265.99 |
| One Year Old System | 13,186,400 | 14,274 | 8,400 | $2,712.06 | $971.74 | $3,772.14 | |
| One Year New Boxes | 15,328,400 | 6,579 | 150 | $1,250.01 | $18.93 | $1,268.94 | $2,503.20 |

Defects corrected by the use of the method of the invention in the foregoing instance of actual practice were summarized by a plant engineer as follows:

(1) Packing in contact with the journal surface created much friction between the lower fibers of the packing and the journal surface, thereby generating excessive heat which released correspondingly excessive quantities of oil from the oil supply held in the waste.

(2) The excessive oiling caused internal friction in the molecular structure of the oil and resulted in adding more heat, thereby further increasing the flow of oil and the objectionable results.

(3) Continuing the vicious cycle, the layer immediately in pressure contact with the shaft became hard and brittle in a comparatively short time, thereby seriously impeding the passage of the oil and resulting finally in burning the journal and its bearing, destroying both.

(4) Owing to the objectionable conditions prevailing under the prior practice, no control could be exercised to protect a shaft or its bearing. The inevitable result was that sooner or later the machine had to be dismantled, the shaft turned down and the bearing renewed. Obviously, this entailed a large and unwarranted expense for labor and tie-up of the machine, in addition to the direct cost of overhauling the shaft and bearing, these costs being not even reflected in the report.

While the invention in the foregoing description is stated in more or less specific terms, it is limited by the scope of the following claims:

1. A method of oiling a shaft bearing, comprising suspending a film of oil of considerable area in spaced relation to a corresponding circumferential shaft area; feeding oil to the said film; and progressively conducting oil from the said film to the said shaft bearing.

2. In a method of oiling as applied to a shaft and its bearing, the step which comprises suspending a film of oil of considerable area in spaced relation to a corresponding circumferential shaft area; feeding oil to the said film; and progressively conducting droplets of oil from the said film to the said shaft bearing.

3. In a method of oiling as applied to a shaft and its bearing, the step which comprises suspending a film of oil of considerable area in spaced relation to a corresponding shaft area, the said film of oil being normally congealed; and heating the congealed film so as to release oil therefrom in a controlled flow dripping upon the shaft area.

4. In a method of oiling as applied to a shaft and its bearing, the step which comprises suspending a film of oil of considerable area in spaced relation to a corresponding shaft area; feeding oil to the said film at numerous individual points distributed throughout the film area; and releasing oil from the said film in individual droplets at numerous points throughout the film area.

5. In a method of oiling, the step which comprises suspending a film of oil from a ceiling surface of considerable area in spaced relation to a corresponding area to be oiled; and conducting oil from the ceiling area to the area to be oiled by dripping the oil from the ceiling at numerous individual points.

DORA H. MADSEN,
*Administratrix of the Estate of Carl W. Madsen, Deceased.*

REFERENCES CITED

The following references are of record in the file of this patent:

FOREIGN PATENTS

| Number | Country | Date |
|---|---|---|
| 68,378 | Switzerland | Nov. 12, 1913 |
| 334,717 | France | Dec. 30, 1903 |